US008946999B2

(12) United States Patent
Kaiser et al.

(10) Patent No.: US 8,946,999 B2
(45) Date of Patent: Feb. 3, 2015

(54) LIGHT EMITTING DEVICE

(75) Inventors: Stephan Kaiser, Regensburg (DE); Thorsten Kunz, Donaustauf (DE); Julius Muschaweck, Gauting (DE)

(73) Assignee: OSRAM Opto Semiconductors GmbH (DE)

( * ) Notice: Subject to any disclaimer, the term of this patent is extended or adjusted under 35 U.S.C. 154(b) by 207 days.

(21) Appl. No.: 13/508,412

(22) PCT Filed: Oct. 20, 2010

(86) PCT No.: PCT/EP2010/065806
§ 371 (c)(1), (2), (4) Date: Jul. 2, 2012

(87) PCT Pub. No.: WO2011/061035
PCT Pub. Date: May 26, 2011

(65) Prior Publication Data

US 2012/0268016 A1 Oct. 25, 2012

(30) Foreign Application Priority Data

Nov. 20, 2009 (DE) ........................ 10 2009 054 067

(51) Int. Cl.
*H01J 1/62* (2006.01)
*G02F 1/335* (2006.01)
(Continued)

(52) U.S. Cl.
CPC ........ *H05B 33/0869* (2013.01); *H05B 33/0872* (2013.01)
USPC .............................. 315/152; 313/483; 349/65

(58) Field of Classification Search
CPC ................................ H01L 33/00; H05B 37/02
USPC ................ 315/157, 152, 291, 158, 307, 309; 257/92
See application file for complete search history.

(56) References Cited

U.S. PATENT DOCUMENTS 6,084,250 A * 7/2000 Justel et al. ..................... 257/89
6,483,095 B1 * 11/2002 Iwaki ........................ 250/214 R
(Continued)

FOREIGN PATENT DOCUMENTS

CN 101099245 1/2008
EP 0 952 757 4/1999
(Continued)

OTHER PUBLICATIONS

English translation of the Japanese Examination Report dated Feb. 24, 2014 for corresponding Japanese Application No. 2012-539253.

*Primary Examiner* — Douglas W Owens
*Assistant Examiner* — Wei Chan
(74) *Attorney, Agent, or Firm* — DLA Piper LLP (US)

(57) ABSTRACT

A light emitting device including a light emitting diode having a semiconductor body that generates electromagnetic radiation; a converter element downstream of the first light emitting diode which converts at least part of the electromagnetic radiation into first color light; a second light emitting diode having a semiconductor body that generates light of the first color; a radiation exit area from which the first color light emerges; and a drive circuit operating the second light emitting diode, wherein the converter element contains at least one luminescence conversion material that emits the first color light, as the operating duration of the first light emitting diode increases, intensity of the first color light emitted by the converter element decreases, the drive circuit controls the second light emitting diode dependent on at least one of measurement values: intensity of the first color light emitted by the converter element, temperature of the converter element, operating duration of the first light emitting diode, and color locus of the light emerging from the radiation exit area.

12 Claims, 2 Drawing Sheets

(51) Int. Cl.
*H05B 37/02* (2006.01)
*H05B 33/08* (2006.01)

(56) References Cited

U.S. PATENT DOCUMENTS

| | | | | |
|---|---|---|---|---|
| 7,736,017 | B2 * | 6/2010 | Huang et al. | 362/231 |
| 7,928,466 | B2 * | 4/2011 | Oppermann et al. | 257/100 |
| 8,093,610 | B2 * | 1/2012 | Wilm et al. | 257/98 |
| 8,403,531 | B2 * | 3/2013 | Negley et al. | 362/249.02 |
| 8,427,062 | B2 * | 4/2013 | Bertram et al. | 315/157 |
| 2002/0097000 | A1 | 7/2002 | Muthu et al. | |
| 2006/0152140 | A1 | 7/2006 | Brandes | |
| 2007/0035707 | A1 | 2/2007 | Margulis | |
| 2007/0081329 | A1 | 4/2007 | Chua et al. | |
| 2007/0120496 | A1 | 5/2007 | Shimizu et al. | |
| 2007/0200513 | A1 | 8/2007 | Ha et al. | |
| 2007/0284994 | A1 * | 12/2007 | Morimoto et al. | 313/483 |
| 2008/0157009 | A1 * | 7/2008 | Wittenberg et al. | 250/494.1 |
| 2008/0290251 | A1 | 11/2008 | Deurenberg et al. | |
| 2009/0040674 | A1 | 2/2009 | Roberts et al. | |
| 2009/0058307 | A1 * | 3/2009 | Bertram et al. | 315/157 |
| 2010/0220261 | A1 * | 9/2010 | Mizushima et al. | 349/64 |
| 2011/0001901 | A1 * | 1/2011 | Solomon et al. | 349/65 |
| 2011/0216538 | A1 * | 9/2011 | Logan et al. | 362/244 |
| 2011/0248370 | A1 * | 10/2011 | Tsoi et al. | 257/437 |
| 2013/0208508 | A1 * | 8/2013 | Nichol et al. | 362/612 |
| 2014/0062318 | A1 * | 3/2014 | Tischler et al. | 315/186 |

FOREIGN PATENT DOCUMENTS

| | | |
|---|---|---|
| EP | 2 063 687 | 5/2009 |
| JP | 2002-208308 | 7/2002 |
| JP | 2005-157316 | 6/2005 |
| JP | 2005-310751 | 11/2005 |
| JP | 2006-172785 | 6/2006 |
| JP | 2007-318050 | 12/2007 |
| JP | 2009-516894 | 4/2009 |
| JP | 2009-17710 | 8/2009 |
| JP | 2009-177095 | 8/2009 |
| WO | 03/075617 A1 | 9/2003 |
| WO | 2005/011006 A1 | 2/2005 |

* cited by examiner

LIGHT EMITTING DEVICE

RELATED APPLICATIONS

This is a §371 of International Application No. PCT/EP2010/065806, with an international filing date of Oct. 20, 2010 (WO 2011/061035, published May 26, 2011), which claims the priority of German Patent Application No. 102009054067.9, filed Nov. 20, 2009, the entire contents of which are hereby incorporated by reference.

TECHNICAL FIELD

This disclosure relates to a light emitting device.

BACKGROUND

There is a need to provide a light emitting device which is particularly stable in respect of aging and can also be produced cost-effectively.

SUMMARY

We provide a light emitting device, including at least one light emitting diode of a first type having a semiconductor body that generates electromagnetic radiation; a converter element disposed downstream of the light emitting diode of the first type which converts at least part of the electromagnetic radiation into light of a first color; at least one light emitting diode of a second type having a semiconductor body that generates light of the first color; a radiation exit area, from which the light of the first color emerges; and a drive circuit that operates the light emitting diode of the second type, wherein the converter element contains at least one luminescence conversion material that emits the light of the first color, as the operating duration of the light emitting diode of the first type increases, intensity of the light of the first color emitted by the converter element decreases, the drive circuit controls the light emitting diode of the second type in a manner dependent on at least one of measurement values: intensity of the light of the first color emitted by the converter element, temperature of the converter element, operating duration of the light emitting diode of the first type, and color locus of the light emerging from the radiation exit area.

DETAILED DESCRIPTION

Figure 1:
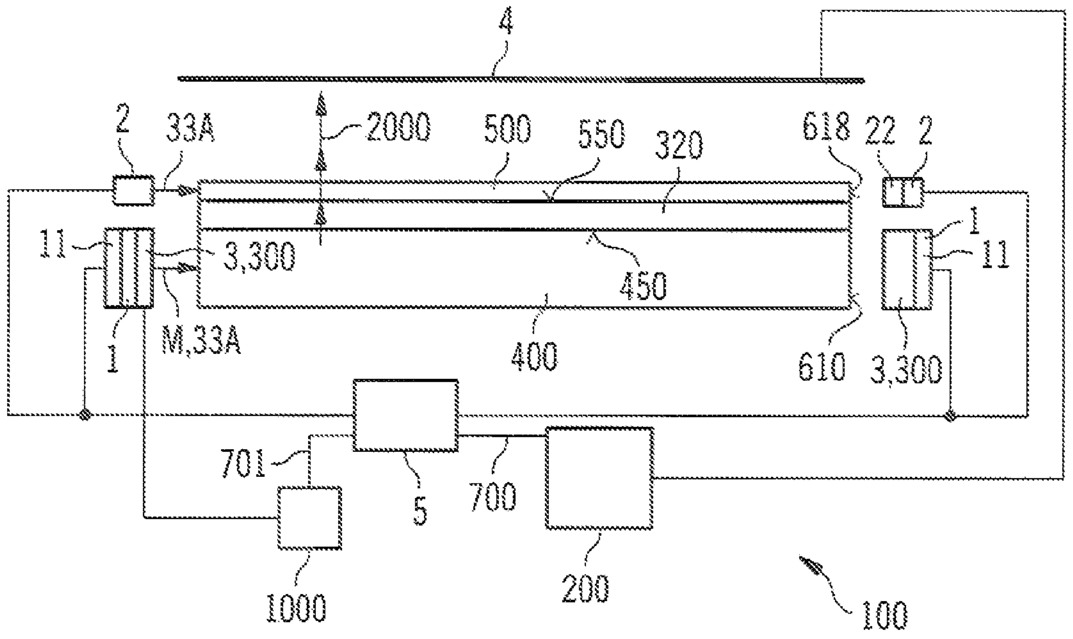
FIGS. 1 to 3 show, in schematic views, examples of a light emitting device.

Our light emitting device, may comprise at least one light emitting diode of a first type having a semiconductor body for generating electromagnetic radiation. In this context, "light emitting diode of a first type" means a characterization of the light emitting diode with regard to the emission wavelength range within the spectrum of the electromagnetic radiation, of electromagnetic radiation emitted by the light emitting diode. Preferably, the light emitting diode emits light in the ultraviolet and/or blue range of the spectrum of the electromagnetic radiation.

A converter element may be disposed downstream of the light emitting diode of the first type, which converter element converts at least part of the electromagnetic radiation into light of a first color. The converter element converts light in one wavelength range into light in another wavelength range.

By way of example, the converter element converts blue light emitted primarily by the light emitting diode of the first type at least partly into green light.

The light emitting device may comprise at least one light emitting diode of a second type having a semiconductor body for generating light of the first color. In other words, both the light emitting diode of the second type and the converter element emit light of the same color. The light of the converter element and of the light emitting diode of the second type is designated as light of the same color if the colors appear identical to the observer.

The light emitting device may comprise a radiation exit area from which the light of the first color emerges. In this case, both the light of the first color emitted by the converter element and the light of the first color emitted by the light emitting diode of the second type emerge from the radiation exit area.

The light emitting device may comprise a drive circuit for operating the light emitting diode of the second type. In this context, "operating" means that the drive circuit regulates and defines, for example, the energization level, energization duration and/or the voltage for the light emitting diode of the second type. Furthermore, it is possible for the drive circuit to additionally operate the light emitting diode of the first type.

The converter element may contain at least one luminescence conversion material, provided for emitting the light of the first color. It is also possible for the converter element to contain further luminescence conversion materials that emit light of further colors. By way of example, the luminescence conversion material is a phosphor which emits green light.

As the operating duration of the light emitting diode of the first type increases, an intensity of the light of the first color emitted by the converter element may decrease. This is substantially due to the fact that the luminescence conversion material contained in the converter element tends to age after a short operating duration and/or after short-term irradiation by electromagnetic radiation. On account of the low aging stability of the luminescence conversion material, the converter element emits less light of the first color as the operating duration increases, as a result of which the intensity of the light of the first color emitted by the converter element decreases. In other words, the converter element does not exhibit stable color conversion on account of the aging phenomena of the luminescence conversion material contained in the converter element.

The drive circuit may control the light emitting diode of the second type in a manner dependent on at least one of the following measurement values: intensity of the light of the first color emitted by the converter element, temperature of the converter element, operating duration of the light emitting diode of the first type, color locus of the light emerging from the radiation exit area.

The light emitting device may comprise at least one light emitting diode of a first type having a semiconductor body for generating electromagnetic radiation and a converter element disposed downstream of the light emitting diode of the first type, which converter element converts at least part of the electromagnetic radiation into light of a first color. Furthermore, the light emitting device may comprise at least one light emitting diode of a second type, having a semiconductor body for generating light of the first color, wherein light of the first color emerges from a radiation exit area. Furthermore, the light emitting device may comprise a drive circuit for operating the light emitting diode of the second type. The converter element may contain at least one luminescence conversion material provided for emitting the light of the first color, wherein, as the operating duration of the light emitting diode of the first type increases, an intensity of the light of the first color emitted by the converter element decreases. A drive circuit may control in a manner dependent on the measurement values intensity of the light of the first color emitted by the converter element, temperature of the converter element, operating duration of the light emitting diode of the first type, color locus of the light emerging from the radiation exit area, the light emitting diode of the second type.

The light emitting device described here is based on the insight, inter alia, that a luminescence conversion material contained in a converter element tends to exhibit aging phenomena after a short operating duration. The aging behavior is usually due to high operating temperatures, moisture effects or irradiation with electromagnetic radiation. The electromagnetic radiation generated by a light emitting diode of a first type is at least partly converted into light of the first color by the converter element disposed downstream of the light emitting diode of the first type. Since the converter element exhibits aging phenomena already after a short operating duration—in comparison with the lifetime of the light emitting diode of the first type,—that is to say after short-term irradiation by electromagnetic radiaton, the converter element emits less converted light. That is to say that the intensity of the converted light decreases. If, by way of example, the light emitted by the converter element mixes with the light from the first light emitting diode, then a radiation exit area through which the light emerges has a different hue depending on the operating duration. In other words, the color locus at the radiation coupling-out area shifts depending on the operating duration.

Thus, to be able to counteract such color locus shifts and at the same time provide a cost-effective light emitting device, the light emitting device uses the concept, inter alia, of providing at least one light emitting diode of a second type, having a semiconductor body for generating light of a first color, wherein a drive circuit serves for operating the light emitting diode of the second type and controls the light emitting diode of the second type in a manner dependent on measurement values.

The light emitting diodes of the second type are readjusted by the drive circuit, as a result of which the color loss caused by the aging instability of the luminescence conversion material is compensated for. By way of example, the light emitting diodes of the second type are energized to a greater level as the operating duration increases, as a result of which the light emitting diode of the second type replaces the lost intensity and color proportion caused by aging of the luminescence conversion material in the conversion element. That is to say that, by readjustment of the light emitting diode of the second type, the intensity, the color locus and/or the brightness at the radiaton exit area remain as constant as possible. In the simplest example, the light emitting diodes of the second type are switched in after a predetermined overall operating duration of the light emitting device. The predetermined overall operating duration chosen is an operating duration starting from which, according to experience, the intensity of the converted light has decreased to such an extent that intensification by the light emitting diode of the second type is necessary. By way of example, such a light emitting device is particularly well suited as backlighting for televisions or displays.

The drive circuit may increase or reduce the intensity of the light of the first color emitted by the light emitting diode of the second type in a manner dependent on at least one of the measurement values stated. It is also possible for the drive circuit to increase or reduce the intensity in a manner dependent on a plurality or all of the stated measurement values. What can thus advantageously be achieved is that, depending on the operating duration, the light emitting diodes of the second type are readjusted particularly precisely by the drive circuit A detector may be provided, which determines the intensity and/or the color locus of the light emerging from the radiation exit area and communicates the measurement values to the drive circuit, which controls the light emitting diode of the second type in a manner dependent on the measurement values. By way of example, the detector detects the intensity of the first color of the light emerging from the radiation exit area. After detection, the detector communicates a value corresponding to the intensity to the drive circuit, whereupon the drive circuit switches in the light emitting diode of the second type, for example, to compensate for a drop in intensity.

A temperature sensor may be provided, which measures the temperature of the converter element and communicates the measurement values to the drive circuit, which controls the light emitting diode of the second type in a manner dependent on the measurement values. Since, in particular, the luminescence conversion material contained in the converter element tends, as the operating temperature increases, to convert electromagnetic radiation less efficiently and/or to emit light of different color loci at different operating temperatures, the temperature sensor advantageously makes it possible to determine the operating temperature of the converter element, as a result of which the light emitting diode of the second type can be switched on by the drive circuit in a "temperature-dependent" manner. That can mean that the light emitting diode of the second type is energized to a greater level by the drive circuit as the temperature of the converter element increases, while the light emitting diode of the first type is "dimmed" to compensate for the increasing temperature heating of the converter element.

The light emitting diode of the second type is switched in during operation starting from a deviation of the maximum intensity of the light emitted by the converter element of at most 10%. In other words, the brightness for an external observer, along the radiation exit area, deviates from a maximum brightness by a maximum of 10% during operation.

The light emitting diode of the second type may be switched in during operation starting from a deviation of color locus coordinates measured by the detector with respect to reference color locus coordinates, determined after the production of the light emitting device, of at most 10%, preferably of at most 5%. By way of example, the light emitting diodes of the second type are energized differently in a manner dependent on the deviation. "Color locus coordinates" are defined in the present case by the X coordinate $C_x$ and the Y coordinate C of the color locus coordinate system in the CIE standard chromaticity system.

Radiation emitted by the light emitting diode of the first type and the light emitted by the converter element may be coupled into a first optical waveguide and the light from the light emitting diode of the second type may be coupled into a second optical waveguide. The first and second optical waveguides are, therefore, separate from one another. By way of example, first and second optical waveguides are stacked one on top of another and are in direct contact with one another such that neither a gap nor an interruption is formed between the first and second optical waveguides. As a result of the coupling of the light of the first color from the light emitting diode of the second type into a second optical waveguide separate from the first optical waveguide, the light first mixes particularly uniformly within the second optical waveguide. It is only after the light mixing in the two optical waveguides that the light in each case couples out again from the two optical waveguides in a light exit direction. The light coupled out from the first optical waveguide can then mix with the light coupled out from the second optical waveguide at least partly at the radiation exit area to be coupled out there from the light emitting device. In this example, the radiation coupling-out area can be formed by an outer area of the second optical waveguide that faces away from the first optical waveguide.

The first optical waveguide may be at least twice as thick in a vertical direction as the second optical waveguide. In this case; "vertical" means a direction perpendicular to a main extension direction of the first and second optical waveguides. Preferably, the first optical waveguide has a thickness of 2 to 6 mm and the second optical waveguide has a thickness of 0.5 to 1 mm. Advantageously, by such a small thickness, in particular of the second optical waveguide, the light emitting device is particularly flat for an external observer. Furthermore, the material costs of the optical waveguides are particularly low as a result of the small thicknesses of the two optical waveguides.

The first and second optical waveguides may be arranged in a manner spaced apart from one another, wherein a radiation-transmissive layer is arranged between the first and second optical waveguides. "Radiation-transmissive" means that the layer is transmissive to electromagnetic radiation at least to the extent of 80%, preferably at least to the, extent of 90%. By way of example, the radiation-transmissive layer is a layer formed with a silicone. Preferably, the radiation-transmissive layer directly adjoins mutually facing outer areas of the first and second optical waveguides. Preferably, the radiation-transmissive layer has a refractive index lying between the refractive index of the first and second optical waveguides. As a result of the refractive index. Matching of the radiatiOn-transmissive layer, a highest possible proportion of light is coupled out from the first and second optical waveguides, as a result of which disturbing back and/or total reflection into the optical waveguides are/is reduced.

Radiation emitted by the light emitting diode of the first type, the light emitted by the converter element and the light from the light emitting diode of the second type may be coupled into a single optical waveguide. That is to say that the light emitting device may comprise exactly one optical waveguide, into which coupling is effected. Advantageously, the entire light generated within the light emitting device can mix in the single optical waveguide such that the light coupled out from the optical waveguide at the radiators exit area produces an especially homogeneous color impression for an external observer.

The light emitting diode of the second type may be arranged along a side area of the optical waveguide. The optical waveguide may be laterally delimited by the side areas. By way Of example, the side areas run transversely or perpendicularly to the main extension plane of the optical waveguide. By virtue of the fact that the light emitting diode of the second type is arranged at the side area, the light emitted by the light emitting diode of the second type can couple into the optical waveguide via the side areas. By way of example, the light emitting diode of the first type is also arranged at a side area of the optical waveguide. The "lateral" arrangement advantageously enables an especially flat device, that is to say a device having a particularly small thickness.

The light emitting diode of the second type may be arranged in the region of a corner of the optical waveguide. Advantageously, the light coupled from the light emitting diode of the second type into the optical waveguide via the corner can propagate in the optical waveguide particularly uniformly, for example, in a fan-like manner from the corner and mix with the light coupled from the light emitting diode of the first type into the optical waveguide. If the light emitting device comprises a plurality of light emitting diodes of the second type, then preferably all corners of the optical waveguide are covered with them. For the case where the optical waveguide has four corners, for example, each of the four corners is covered with at least one light emitting diode of the second type. The, light emitting device then has at least four light emitting diodes of the second type.

In this context, it is possible for an optical element, for example, a lens, to be arranged between the light emitting diode of the second type and the optical waveguide. By way of example, the optical element is then applied to the light emitting diode of the second type. Preferably, the optical element, generates a larger emission cone of the light emitting diode of the second type, as a result .of which coupling into the optical waveguide is already effected over a larger area.

The light emitting, device may comprise at least one further luminescence conversion material contained in the converter element, which at least one further luminescence conversion material converts at least part of the radiation into light of a further color. By way of example, the light of the further color is red light. In other words, blue light emitted by the light emitting diode of the first type can then be partly converted, in the converter element, into red and green light, which can then mix together with the blue light emitted by the light emitting diode of the first type to form white light. Furthermore, it is conceivable. for the converter element to contain even further luminescence conversion materials, which partly converts the electromagnetic radiation emitted by the light emitting diode of the first type into further colors.

Furthermore, the light emitting device comprises at least one light emitting diode of a further type having a semiconductor body for generating light Of the further color. If the light of the further color is red, then the light emitting diode of the further type preferably also emits red light. Likewise, the light emitting device can have light emitting diodes of additional further types for generating different colors.

As the operating duration of the light emitting diode of the first type increases, an intensity of the radiation converted by the converter element to form light of the further color decreases.

Moreover, the drive circuit additionally operates the at least one light emitting diode of the further type and controls the latter in a manner dependent on the stated measurement values.

The light emitting device described here is explained in greater detail below on the basis of examples and the associated figures.

In the examples and the figures, identical or identically acting constituent parts are in each case part provided with the same reference symbols. The elements illustrated should not be regarded as true to scale; rather, individual elements may be illustrated with an exaggerated size in order to afford a better understanding.

FIG. 1 illustrates, on the basis of a schematic side view, a light emitting device 100 having a first optical waveguide 400 and a second optical waveguide 500. By way of example, the two optical waveguides are formed with polymethyl methacrylate (also called PMMA) or a glass. Furthermore, the second optical waveguide 500 can be formed with a material which guides light of a first color 33A, for example, green light, particularly well. Light emitting diodes of a first type 1 and light emitting diodes of a second type 2 are arranged laterally, that is to say in the region of side areas 610 and 618 of the first optical waveguide 400 and of the second optical waveguide 500. A converter element 3 for converting the electromagnetic radiation emitted by the light emitting diodes of the first type 1 is applied to the light emitting diodes of the first type 1. The converter element 3 partly converts the electromagnetic radiation emitted by the light emitting diode of the first type 1 into light having a different wavelength. In this case, the light emitting diode of the first type 1 is alight emitting diode having a semiconductor body 11 for generating blue light. On account of a luminescence conversion material 300 contained in the converter element 3, the blue light coupled into the converter element 3 from the light emitting diode of the first type 1 is partly converted into green light. Green and blue light then mix to form white light and produce the mixed light M. Via the side areas 610 of the first optical waveguide 400, the mixed light M subsequently couples into the first optical waveguide 400 and spreads preferably uniformly therein.

The light emitting diodes of the second type 2 are light emitting diodes having a semiconductor body 22 for generating light of the first color 33A. In this case, the light of the first color 33A is green light. The light of the first color 33A emitted by the light emitting diodes of the second type 2 couples via side areas 618 of the second optical waveguide 500 into the second optical waveguide 500. A radiation-transmissive layer 320, which is formed with a silicone, for example, is arranged between an outer area 450 of the first optical waveguide 400 and an outer area 550 of the second optical waveguide 500. The first optical waveguide 400 and the second optical waveguide 500 connect to one another via the radiation-transmissive layer 320. After the coupling of the light into the optical waveguides 400. and 500, the light is coupled out from the two optical waveguides 400 and 500 in a light exit direction 2000. At a radiation exit area 4, both the mixed light M coupled out from the first optical waveguide 400 and the light of the first color 33A coupled out from the second optical waveguide 500 are superimposed, for example, to form white light.

Furthermore, the light emitting device 100 comprises a drive circuit 5 for operating the light emitting diodes of the first type 1 and of the second type 2. Furthermore, the light emitting device 100 has a temperature sensor 1000 and a detector 200. The temperature sensor 1000 measures the. temperature of the converter element 3 and communicates values 701 corresponding to the measurement values to the drive unit. The detector 200 measures at the radiation exit area 4 both the intensity and the color locus of the light emerging from the radiation exit area 4, wherein the detector 200 communicates values 700 corresponding to the measurement values to the drive circuit 5. The drive circuit, therefore, controls the light emitting diodes of the first type 1 and of the second type 2 in a manner dependent on the intensity of the light of the first color 33A emitted by the converter element 3, the temperature of the converter element 3, the operating duration of the light emitting diode of the first type 1, the color locus of the light emerging from the radiation exit area 4. It is likewise conceivable for the drive circuit to control the light emitting diodes of the first type 1 and/or of the second type 2 in a manner dependent on only one measurement value, for example, the operating duration of the light emitting diodes of the second type 2. The detector 2000 and the temperature sensor 1000 are not necessary in that case. By way of example, the light emitting, device then merely comprises an operating-hours meter, which communicates corresponding time values to the drive circuit 5.

Figure 2:
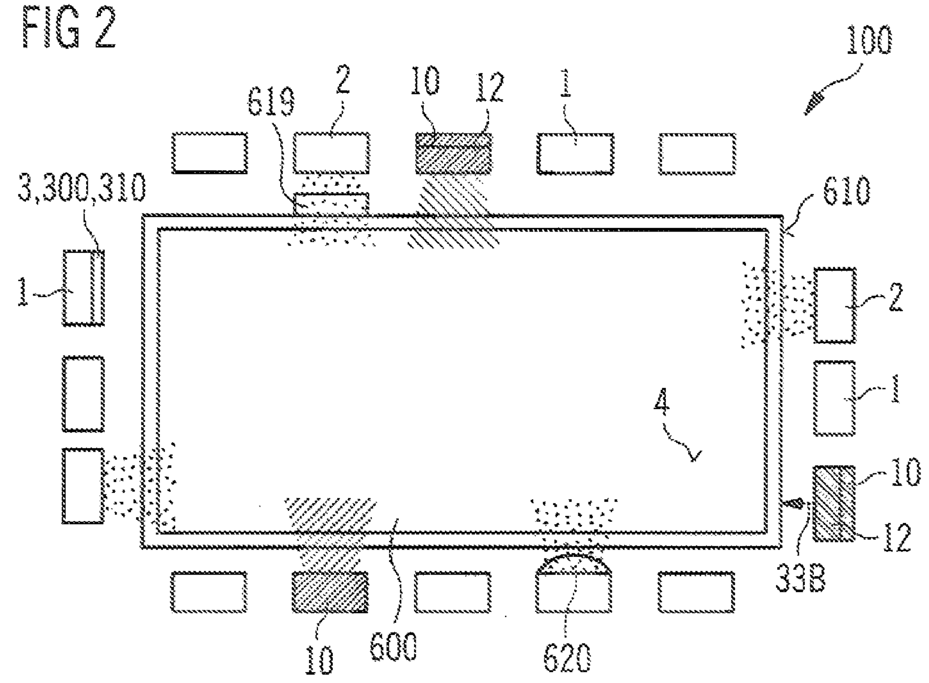

FIG. 2 shows, in a schematic plan view, a light emitting device 100 comprising a single optical waveguide 600. By way of example, the optical waveguide 600 is formed with polymethyl methacrylate or a glass. It is likewise possible for the optical waveguide 600 to be formed with two films lying opposite one another, between which air is situated as a propagation medium for the light (also called air guide). One of the films can then be embodied in reflective fashion, wherein the light is coupled out from the optical waveguide 600 via the respective other partly reflective and/or partly absorbent film, which forms the radiation exit area 4 of the light emitting device 100. In other words, the reflective film and the radiation exit area 4 then lie opposite one another.

Both the light emitting diodes of the first type 1 and the light emitting diodes of the second type 2 are arranged along the side areas 610. Furthermore, light emitting diodes of a further type 10 are arranged along the side areas 610, which have a semiconductor body 12 for generating light of a further color 33B, red light in the present case. It is conceivable for the light emitting diodes 1, 2 and 10 to be arranged along the side areas 610 in a predeterminable pattern, for example, periodically in mutually alternating fashion or in group-like fashion. Furthermore, alongside the luminescence conversion material 300 described here, the converter element 3 additionally has a luminescence conversion material 310. The luminescence conversion material 310 converts the electromagnetic radiation, blue light in this case, emitted by the light emitting diodes of the first type 1 partly into light of the further color 33B, for example red light. All three light colors, that is to say blue, red and green, can then mix to form white light, mixed light M. Both the emitted mixed-light M and the light of the first color 33A and the light of the second color 33B therefore couple into a single optical waveguide 600 and mix within the optical waveguide 600 once again as homogeneously as possible.

It is conceivable for the optical waveguide itself to have light coupling-in structures 619. By way of example, the side areas 610 are then embodied in the form of such light coupling-in structures 619. The light coupling-in structures 619 can then comprise roughened portions or be embodied in lens-type fashion. Moreover, such light coupling-in structures 619 can be applied to the side areas 610, for example. The coupling-in structures 619 can significantly increase a coupling-in efficiency of the light emitted by the light emitting diodes and the converter elements 3. In this context, "coupling-in efficiency" means the ratio of radiation actually coupled into the optical waveguide 600 to radiation impinging on the optical waveguide 600. It is also conceivable for the coupling-in structures 619 only to increase the coupling-in efficiency of the light from the light emitting diodes of the second type 2 and/or the light emitting diodes of the further type 10 into the optical waveguide 600. The coupling-in structures 619 are then coordinated wavelength-selectively and/or with the emission wavelength range of the light emitting diodes 2 and 10.

Alternatively or additionally, an optical element 620 can be arranged between one or a plurality of the light emitting diodes of the second type 2 and/or the light emitting diodes of the further type 10 and the optical waveguide 600. A larger emission cone of the light emitting diode of the second type 2 and/or of the light emitting diode of the further, type 10 can advantageously be generated with the optical element 620. By way of example, the optical element 620 is a light expanding lens applied in each case to the light emitting diodes of the second type 2 and/or the light emitting diodes of the further type 10. Through the light expanding lens 620, the light emitted by the light emitting diodes can couple into the optical waveguide 600 over a large area, for example via the coupling-in structures 619 situated on the side areas 600.

Advantageously, on account of the improved coupling-in efficiency, the number of light emitting diodes of the second type 2 and/or of the further type 10 can be kept as small as possible, thus resulting in considerable cost savings for producing the light emitting device 100.

Figure 3:
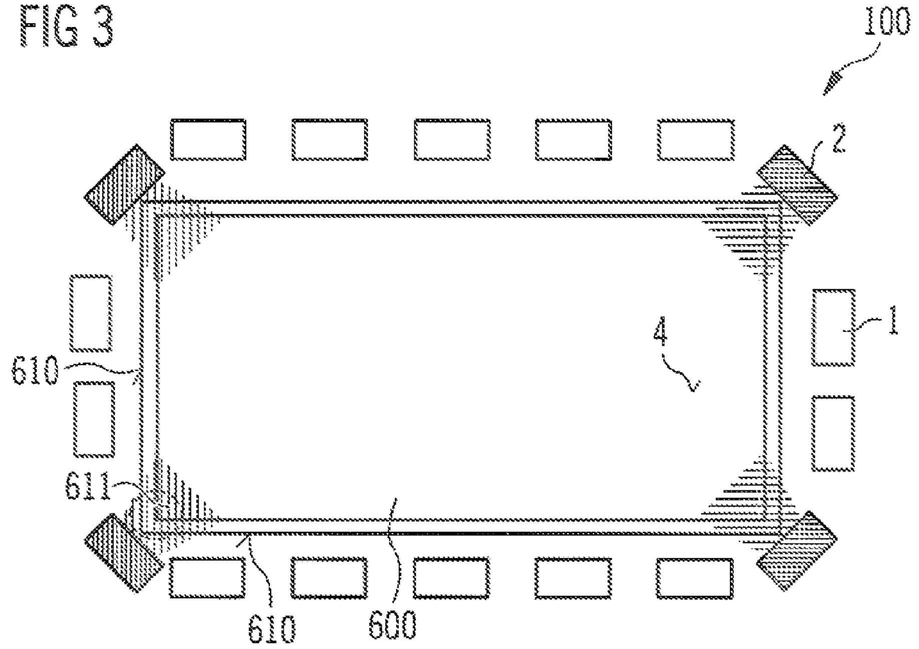

FIG. 3 shows, in contrast to the example in FIG. 2, that the light emitting diodes of the second type 2 are arranged only at corners 611, wherein the light emitting diodes of the first type 1 are situated at the side areas 610. Advantageously, a largest possible proportion of the light generated by the light emitting diodes of the second type 2 is thus coupled into the optical waveguide 600 and can spread, for example, in a fan-like fashion from the corners 611 in the optical waveguide 600. In a. plan view of the optical waveguide 600, the latter is rectangular. That is to say that the light emitting device 100 comprises at least four light emitting diodes of the second type 2 positioned-only at the corners 611. Advantageously, with the "comer coupling-in" of the light from the second light emitting diodes 2, a smaller number of light emitting diodes of the second type 2 is required, which proves to be particularly cost-effective, for example.

In this context, it should be pointed out that alternatively the light emitting diodes of the second type 2, besides the arrangement at the corners 611, can additionally also be fitted along the side areas 610 of the optical waveguide 600.

Our devices are not restricted by this description on the basis of the examples. Rather, our devices encompass any novel feature and also a combination of features which, in particular, includes any combination of features in the appended claims, even if the feature or combination itself is not explicitly specified in the claims or the examples.

The invention claimed is:

1. A light emitting device, comprising:
- at least one light emitting diode of a first type having a semiconductor body that generates electromagnetic radiation;
- a converter element disposed downstream of the light emitting diode of the first type which converts at least part of the electromagnetic radiation into light of a first color;
- at least one light emitting diode of a second type having a semiconductor body that generates light of the first color;
- a radiation exit area from which the light of the first color emerges;
- a drive circuit that operates the light emitting diode of the second type; and
- a detector that determines the intensity and/or the color locus of the light emerging from the radiation exit area and communicates measurement values to the drive circuit and controls the light emitting diode of the second type in a manner dependent on the measurement values,
- wherein;
  - the converter element contains at least one luminescence conversion material that emits the light of the first color,
- as the operating duration of the light emitting diode of the first type increases, intensity of the light of the first color emitted by the converter element decreases,
- the drive circuit controls the light emitting diode of the second type in a manner dependent on at least one of measurement values; intensity of the light of the first color emitted by the converter element, temperature of the converter element, operating duration of the light emitting diode of the first type, and
- color locus of the light emerging from the radiation exit area.

2. The light emitting device according to claim 1, wherein the drive circuit increases or reduces the intensity of the light of the first color emitted by the light emitting diode of the second type in a manner dependent on at least one of the measurement values stated.

3. The light emitting device according. to claim 1, further comprising a temperature sensor which measures temperature of the converter element and communicates measurement values to the drive circuit and controls the light emitting diode of the second type in a manner dependent on the measurement values.

4. The light emitting device according to claim 1, wherein the light emitting diode of the second type is switched in during operation starting from a deviation of the maximum intensity of the light emitted by the converter element of at most 10%.

5. The light emitting device according to claim 1, wherein the light emitting diode of the second type is switched in during operation starting from a deviation of color locus coordinates measured by the detector with respect to reference color locus coordinates, determined after production of the light emitting device, of at most 10%.

6. The light emitting device according to claim 1, wherein the radiation emitted by the light emitting diode of the first type and the light emitted by the converter element are coupled into a first optical waveguide and the light from the light emitting diode of the second type is coupled into a second optical waveguide.

7. The light emitting, device according to claim 6, wherein the first optical waveguide is at least twice as thick in a vertical direction as the second optical waveguide.

8. The light emitting device according to claim 6, wherein the first and second optical waveguides are arranged in a manner spaced apart from one another, and a radiation-transmissive layer is arranged between the first and second optical waveguides.

9. The light emitting device according to claim 1, wherein the radiation emitted by the light emitting diode of the first type, the light emitted by the converter element and the light from the light emitting diode of the second type are coupled into a single optical waveguide.

10. The light emitting device according to claim 9, wherein the light emitting diode of the second type is arranged along a side area of the optical waveguide.

11. The light emitting device according to claim 9, wherein the light emitting diode of the second type is arranged in a region of a corner of the optical waveguide.

12. The light emitting device according to claim 1, further comprising:
- a further luminescence conversion material contained in the converter element which converts at least part of the radiation into light of a further color:
- at least one light emitting diode of a further type having a semiconductor body that generates light of the further color,
- wherein:
  - as operating duration of the light emitting diode of the first type increases, an intensity of the radiation converted by the converter element to form light of the further color decreases,
  - the drive circuit additionally operates the at least one light emitting diode of the further type, and
  - the drive circuit controls the at least one light emitting diode of the further type in a manner dependent on the stated measurement values.

* * * * *

UNITED STATES PATENT AND TRADEMARK OFFICE

CERTIFICATE OF CORRECTION

PATENT NO. : 8,946,999 B2
APPLICATION NO. : 13/508412
DATED : February 3, 2015
INVENTOR(S) : Kaiser et al.

It is certified that error appears in the above-identified patent and that said Letters Patent is hereby corrected as shown below:

In the Claims

In column 9, at line 59, please change "values;" to -- values: --.

Signed and Sealed this
Eighth Day of September, 2015

Michelle K. Lee
*Director of the United States Patent and Trademark Office*